UNITED STATES PATENT OFFICE.

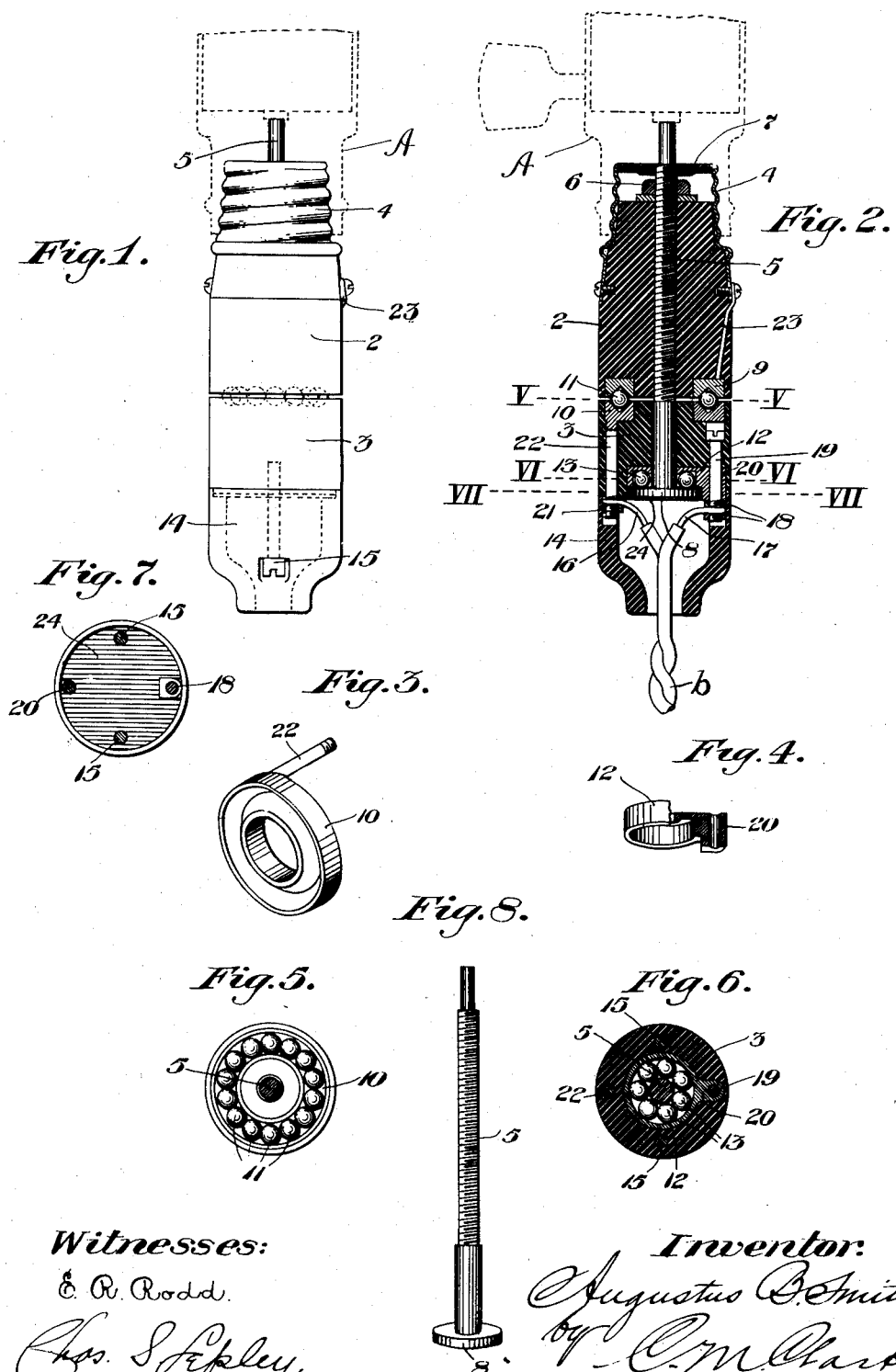

AUGUSTUS B. SMITH, OF WILKINSBURG, PENNSYLVANIA.

SWIVEL-JOINT FOR ELECTRIC CURRENTS.

No. 893,880.  Specification of Letters Patent.  Patented July 21, 1908.

Application filed March 22, 1906, Serial No. 307,515. Renewed May 1, 1907. Serial No. 371,240.

*To all whom it may concern:*

Be it known that I, AUGUSTUS B. SMITH, a citizen of the United States, residing at Wilkinsburg, in the county of Allegheny and State of Pennsylvania, have invented certain new and useful Improvements in Swivel-Joints for Electric Currents, of which the following is a specification, reference being had therein to the accompanying drawing.

My invention refers to improvements in swivel joints for electric conductors, and has for its object to provide a device of this character capable of being connected with any stationary source of current, as a socket and provided with a depending rotatable portion with which the current distributing wires are connected, by which the ultimate current consuming device, as a movable motor or any other equivalent may be freely moved around in various directions, without interruption of the current circulation.

Referring now to the drawings:—Figure 1. is a view of the device in elevation, the connecting socket being shown in dotted lines. Fig. 2. is a central vertical section of Fig. 1. Fig. 3. is a perspective detail view of one of the upper pair of ball race contacts. Fig. 4. is a similar view of the lower rotating ball race contact. Fig. 5. is a horizontal sectional view on the line V. V. of Fig. 2. Fig. 6. is a similar section on the line VI. VI. of Fig. 2. Fig. 7. is a similar section on the line VII. VII. of Fig. 2. Fig. 8. is a detail view of the central stem.

The device generally consists of a stationary base 2 and a rotating base 3 of insulating material, as fiber, said base 3 being rotatably connected with relation to the stationary base 2. The base 2 is provided with an upper outer threaded thimble 4 or other suitable contact adapted to be screwed into or otherwise connected with a receiving current supplying base A, shown in dotted lines, with the inner shell of which the screw threaded base or socket 4 makes electrical contact for one of the poles of the circuit.

5 is a stationary stem screw threaded throughout its middle portion as shown, abutting at its upper end against the central contact portion of base socket A, with which it makes electrical contact and constitutes the other pole of the circuit. The base 2 surrounds and is mounted upon stem 5 and is fixedly secured therein by means of the threaded portion engaging a correspondingly interiorly threaded central hole and is securely held by means of a locking nut 6 and its washer, as clearly shown. The upper portion of the threaded shell or thimble 4 is preferably provided with an insulating end 7 of porcelain or other suitable material.

The stem 5 extends downwardly through the center of the rotating block 3 and is provided with a terminal disk 8 at the bottom, which supports the lower block and its connections, while the adjacent ends of blocks 2 and 3 are provided with current transmitting rings 9 and 10 having oppositely disposed ball race grooves arranged to receive the circular series of bearing balls 11 of steel or other suitable current-transmitting material. The lower rotating block 3 is also provided with a similar ball race bearing 12 between which and the stationary supporting disk 8 of stem 5 are arranged an annular series of similar bearing balls 13, and by this construction it will be seen that the free rotation of the block 3 is greatly facilitated.

By adjusting the stem 5, the blocks 2 and 3 may be accurately set with relation to each other and rigidly maintained by reason of the threaded engagement with the upper block and lock nut 6. Depending downwardly from the lower portion of block 3 is a terminal coping shell 14 secured to block 3 by screws 15 or otherwise, into the interior of which are introduced the terminals 16, 17, of the current distributing wires *b*. The end of wire 17 is electrically connected with ball race 12 by means of binding screw nuts 18 making contact through threaded stem 19 and lateral lug 20 of ring 12, by which construction a current is at all times established through stem 5 to wire 17 from the center contact of base A. Wire 16 is connected by binding screw nut 21 with stem or wire 22 extending downwardly from the rotating ball race ring 10, in constant electrical circuit with the upper stationary ball race 9, which ball race ring 9 is connected with the other contact of base A by means of a connecting wire 23 connected with threaded shell 4, or by other suitable current conveying device.

24 is a disk of insulating material extending across the bottom of rotating block 3, thereby effectually insulating the disk 8 from accidental contact with either of wires 16 or 17.

By this construction and arrangement it will be seen that both poles of the current are at all times maintained in circuit with distributing wires 16, 17, irrespective of whatever position the current consuming device to which these wires lead, may assume. The wires may be moved around in any direction or may be twisted and the lower rotatable base will freely move around by reason of the intervening rolling connections which also serve to transmit the current at all times.

In place of the balls 11 or 13, it will be understood that rollers of any form may be employed, or wheels or other equivalent devices adapted to facilitate the turning operation and at the same time to transmit the current from the stationary circuit terminals to the rotating terminals, to perform the functions in view.

It will be understood that the arrangement or design of the device may be greatly varied, as for instance in making it in disk form with much greater diameter and less height, or that various other changes or variations may be made by the skilled mechanic; but all such changes are to be considered as within the scope of the following claims.

What I claim is:—

1. A swivel joint for electric currents comprising a stationary base provided with current supplying terminals, a rotatable portion provided with current consuming terminals, and intervening unattached rolling current transmitting devices, substantially as set forth.

2. A swivel joint for electric currents comprising a stationary base provided with current supplying terminals, a rotatable portion provided with current consuming terminals, and separate series of unattached rolling current transmitting devices arranged to establish communication between the stationary and the rotating terminals respectively, substantially as set forth.

3. A swivel joint for electric currents comprising a stationary base provided with an outer contacting shell, and an inner contacting stem having current transmitting terminals, a rotatable portion provided with current consuming terminals, and movable current transmitting devices intervening between the stationary base and the rotatable portion adapted to maintain electrical communication between said contacting shell and stem and said current consuming terminals, substantially as set forth.

4. A swivel joint for electric currents comprising a stationary base provided with an outer contacting shell, a ball race ring, and an inner contacting stem secured in the stationary base and provided with an abutting contact and terminal flange; and a rotatable portion having a corresponding ball race ring and a series of contact balls, a secondary ball race ring and a series of balls engaging the terminal flange, and current consuming wires connected with the rings of the rotatable portion, substantially as set forth.

5. In a swivel joint for electric currents, the combination of a stationary base having a central stem provided with an abutting terminal and a terminal flange, an exterior contacting shell and a communicating ball race ring, a rotatable portion provided with a primary ball race ring and a series of balls communicating with the ring of the shell, a secondary ball race ring and a series of balls communicating with the terminal flange, and means for connecting current consuming wires with the primary and secondary ball race rings respectively, substantially as set forth.

6. In a swivel joint for electric currents, the combination of a stationary base having a central stem provided with an abutting terminal and a terminal flange, an exterior contacting shell and a communicating ball race ring, a rotatable portion provided with a primary ball race ring and a series of balls communicating with the ring of the shell, a secondary ball race ring and a series of balls communicating with the terminal flange, and means for connecting current consuming wires with the primary and secondary ball race rings respectively, with a transverse insulating diaphragm covering the terminal flange, substantially as set forth.

7. In a swivel joint for electric currents, the combination of a stationary base having a central stem provided with an abutting terminal and a terminal flange, an exterior contacting shell and a communicating ball race ring, a rotatable portion provided with a primary ball race ring and a series of balls communicating with the ring of the shell, a secondary ball race ring and a series of balls communicating with the terminal flange, and means for connecting current consuming wires with the primary and secondary ball race rings respectively, with a transverse insulating disk mounted between the central stem and the contacting shell, substantially as set forth.

8. In a swivel joint for electric currents, the combination of a stationary base having a central stem provided with an abutting terminal and a terminal flange, an exterior contacting shell and a communicating ball race ring, a rotatable portion provided with a primary ball race ring and a series of balls communicating with the ring of the shell, a secondary ball race ring and a series of balls communicating with the terminal flange, and means for connecting current consuming wires with the primary and secondary ball race rings respectively, with a transverse insulating diaphragm covering the terminal flange, and a transverse insulating disk mounted between the central stem and the contacting shell, substantially as set forth.

9. In a swivel joint for electric currents, the combination with a base portion having current-supplying elements, of a relatively rotatable portion having current conveying elements, and intervening unattached rolling current-transmitting devices.

10. In a swivel joint for electric currents, the combination with a base portion having means for making electrical connection with a source of supply, a relatively rotatable element having means for distributing the current, and intervening unattached rolling devices arranged to make electrical communication between the base portion and said rotatable element.

11. A swivel joint for electric currents comprising a base portion having a current-supplying element and constituting a race-way, a relatively movable portion having a current-conveying element and constituting a companion race-way, and intervening current-transmitting devices in rolling contact with each of said race-way portions.

12. A swivel joint for electric currents comprising a grooved base portion having a current-transmitting element and constituting a race-way, a relatively movable portion having a current-transmitting element and constituting a companion race-way, and intervening current-transmitting devices in rolling contact with each of said race-way portions.

13. In a swivel joint for electric currents, the combination with a base portion having a current-supplying element, of a relatively rotatable portion having a current-conveying element, and intervening contact balls.

14. In a swivel joint for electric currents, the combination with a base portion having a current-supplying element, of a relatively rotatable portion having a current-conveying element, and intervening rolling current-transmitting devices relatively movable with relation to each of said portions.

In testimony whereof I affix my signature in presence of two witnesses.

AUGUSTUS B. SMITH.

Witnesses:
CHAS. S. LEPLEY,
C. M. CLARKE.